US008042924B2

(12) United States Patent
Imai

(10) Patent No.: US 8,042,924 B2

(45) Date of Patent: Oct. 25, 2011

(54) ATTACHMENT STRUCTURES, LIQUID EJECTION HEAD UNIT AND METHOD FOR MANUFACTURING A LIQUID EJECTION HEAD UNIT

(75) Inventor: Kazuyoshi Imai, Sakata (JP)

(73) Assignee: Seiko Epson Corporation, Tokyo (JP)

( * ) Notice: Subject to any disclaimer, the term of this patent is extended or adjusted under 35 U.S.C. 154(b) by 364 days.

(21) Appl. No.: 12/234,070

(22) Filed: Sep. 19, 2008

(65) Prior Publication Data

US 2009/0085958 A1 Apr. 2, 2009

(30) Foreign Application Priority Data

Sep. 19, 2007 (JP) ................................ 2007-241915

(51) Int. Cl.

*B41J 2/175* (2006.01)
*B29C 65/08* (2006.01)
*B29C 37/00* (2006.01)
*B06B 1/02* (2006.01)

(52) U.S. Cl. ............. 347/85; 347/84; 347/93; 156/73.1; 156/580.1; 264/442

(58) Field of Classification Search .................... 347/84, 347/85; 156/580.1; 264/442

See application file for complete search history.

(56) References Cited

U.S. PATENT DOCUMENTS

2001/0030676 A1* 10/2001 Owaki et al. .................... 347/93
2001/0044004 A1* 11/2001 Arakawa et al. ............. 428/65.1
2003/0160841 A1* 8/2003 Takata et al. .................... 347/50
2005/0189740 A1* 9/2005 Stevens ...................... 280/728.2

FOREIGN PATENT DOCUMENTS

JP 2005-262646 9/2005

* cited by examiner

*Primary Examiner* — Ryan Lepisto

(74) *Attorney, Agent, or Firm* — Maschoff Gilmore & Israelsen

(57) ABSTRACT

Bondage of an ink supply needle and a holder base is appropriately performed by ultrasonic welding. A filter is housed in a filter storing part from the upper side of the holder base, and a needle-side fitting part is fitted into a base-side fitting part from the upper side of the holder base. Then, when the ink supply needle and the holder base are welded by ultrasonic waves, the energy of ultrasonic oscillation is concentrated on a contact portion of a protruded part of a needle-side bondage part and a base-side bondage part, and the contact portion of the protruded part is melted out so as to weld the ink supply needle and the holder base. Thereby, the contact portion of the ink supply needle and the holder base is appropriately bonded by ultrasonic welding as a whole without any gap.

12 Claims, 6 Drawing Sheets

ATTACHMENT STRUCTURES, LIQUID EJECTION HEAD UNIT AND METHOD FOR MANUFACTURING A LIQUID EJECTION HEAD UNIT

CROSS REFERENCES TO RELATED APPLICATIONS

The entire disclosure of Japanese Patent Application No. 2007-241915, filed on Sep. 19, 2007 is expressly incorporated by reference herein.

BACKGROUND

1. Technical Field

The present invention relates to an attachment structure of an ink supply needle in which the ink supply needle is attached to a holder base by ultrasonic welding.

2. Related Art

As a structure body that is used in a liquid ejecting apparatus that ejects a liquid such as ink of a printer, a color liquid material of a color filter, an electrode liquid material, or a bioorganic liquid material, a structure body formed by an ink supply needle and a holder base has been known.

The ink supply needle is formed by performing an injection molding process for synthetic resin that is to be inserted into a liquid container such as an ink cartridge.

The holder base is formed by performing an injection molding process for synthetic resin used for supporting an ejection head such as a record head.

FIG. 7 shows an attachment structure of an ink supply needle for a holder base which has been disclosed in paragraph No. 0003 to 0005 and FIG. 14 of Patent Document 1.

In FIG. 7, a filter 2 is interposed between an ink supply needle 1 and a holder base 3 so as to cover a base passage 12. In a state in which a bondage part 31 of the ink supply needle 1 and a base-side bondage part 32 of the holder base 3 are brought into contact with each other, a contact portion 33 of the needle-side bondage part 31 and the base-side bondage part 32 that has a flat shape are welded by performing an ultrasonic welding process.

However, since the contact portion 33 is configured only as a flat surface, the energy in the ultrasonic welding process may be easily distributed to both sides of the needle-side bondage part 31 and the base-side bondage part 32, and there is a case where the contact portion 33 is not bonded without any gap as a whole.

When the structure body in which the contact portion 33 of the ink supply needle 1 and the holder base 3 is not bonded without any gap as a whole is used in a liquid ejecting apparatus, the ink supply needle 1 is inserted into a needle connection opening part of a liquid container 34, an ejection head 35 is supported by the holder base 3, and liquid is supplied from the liquid container 34 to the ejection opening part of the ejection head 35, then there is a defect that the liquid flowing from the ink supply needle 1 to the holder base 3 side may leak from the gap of the contact portion 33 to the outside due to an elapse of a long time period.

In particular, since the contact portion 33 is formed by performing an injection molding process, microscopically, the front and rear surfaces are formed of convex surfaces, and the front and rear surfaces become convex-concave surfaces due to attachment of dust or the like. Accordingly, the ultrasonic waves are concentrated on the contact portion of the concave part, and the local end of the contact portion may be easily melted. Therefore, welding is not sufficient in spots of the concave parts, and accordingly, a defection may easily occur.

First of all, in order to perform the ultrasonic welding process assuredly, lengthening a time for supplying the ultrasonic waves may be considered. However, in such a case, a time needed for the manufacturing process is lengthened, and accordingly, it is not appropriate for mass production.

SUMMARY

The object of the present invention is to weld the liquid supply needle and the holder base without incurring any gap by performing an ultrasonic welding process, in consideration of the above-described situations.

The attachment structure of the ink supply needle according to the present invention, in an attachment structure of an ink supply needle in which a contact portion of the ink supply needle and a contact potion of the holder base are brought into contact with each other so as to be bonded by performing an ultrasonic welding process, a protruded part, which concentrates the energy at a time when the ultrasonic welding process is performed, is disposed in one or both of the contact portions of the ink supply needle and the holder base, as the most important aspect.

Under the attachment structure of the ink supply needle according to the present invention, when the contact portion of the ink supply needle and the contact portion of the holder base are brought into contact with each other to be bonded by an ultrasonic welding process, by concentrating the energy of the ultrasonic welding process onto a protruded part to be melted out, the contact portion of the ink supply needle and the contact portion of the holder base are melted as a whole to be appropriately bonded in accompaniment with melting the protruded part. Accordingly, a gap between the contact portion of the ink supply needle and the contact portion of the holder base is not generated.

Accordingly, in the structure in which the ink supply needle is installed to the holder base, there is an advantage that a liquid flowing from the ink supply needle to the holder base side does not leak out from between the contact portion of the ink supply needle and the contact portion of the holder base to the outside.

In addition, the ultrasonic process is performed by performing a process for raising the melting point for at least the protruded part. Accordingly, a contact portion of the counterpart side with which the protruded part is brought into contact is melted first, and the protruded part is melted after the protruded part is buried into the melted portion. Thus, an advantage that the integrity is improved can be acquired.

In addition, an anneal process, an infrared ray projecting process, or an injection molding process at a high molding temperature of 150 degrees or above is performed for the protruded part or the ink supply needle or the holder base that has this protruded part. Accordingly, the melting point of the protruded part or the ink supply needle or the holder base that has this protruded part can be raised by using a simple method, and accordingly, an advantage that the integrity of the protruded part and the contact portion is improved can be acquired.

In addition, the protruded part is formed by being molded in the shape of a ring near the ink supply needle, an integrated portion that surrounds the connection portion of the ink supply needle and the holder base can be acquired by performing an ultrasonic welding process. Accordingly, leakage of gas of ink or vapor water in the outer circumferential direction can be prevented assuredly.

In addition, a housing part in which a part of the melt resin is housed is formed in the vicinity of the protruded part. Thus, in a case where the ink supply needle is welded to the holder base by using ultrasonic waves, even when the melt resin is melted out, the melt resin can be easily housed in the housing part. Accordingly, the ultrasonic welding process is performed smoothly without being blocked by prior melted resin, and thus, a time needed for an ultrasonic welding process can be shortened.

In addition, the housing part is formed by a groove in the shape of a ring, the resin melted from the entire periphery of the ink supply needle can be effectively housed in the housing part. Accordingly, the melted resin can be housed over the entire periphery in an easy manner, and a time needed for the ultrasonic welding process can be shortened.

In addition, at least one between the ink supply needle and the holder base is molded by using resin containing a plate-shaped filler. Thus, the filler is contained in the ink supply needle or the holder base, and accordingly a route of leakage of the gas of ink or vapor water from the inner side to the outer side can be set to be substantially long. Accordingly, the leakage of the gas and the like can be effectively blocked, and thereby high reliability can be acquired.

DESCRIPTION OF EXEMPLARY EMBODIMENTS

Figure 1:
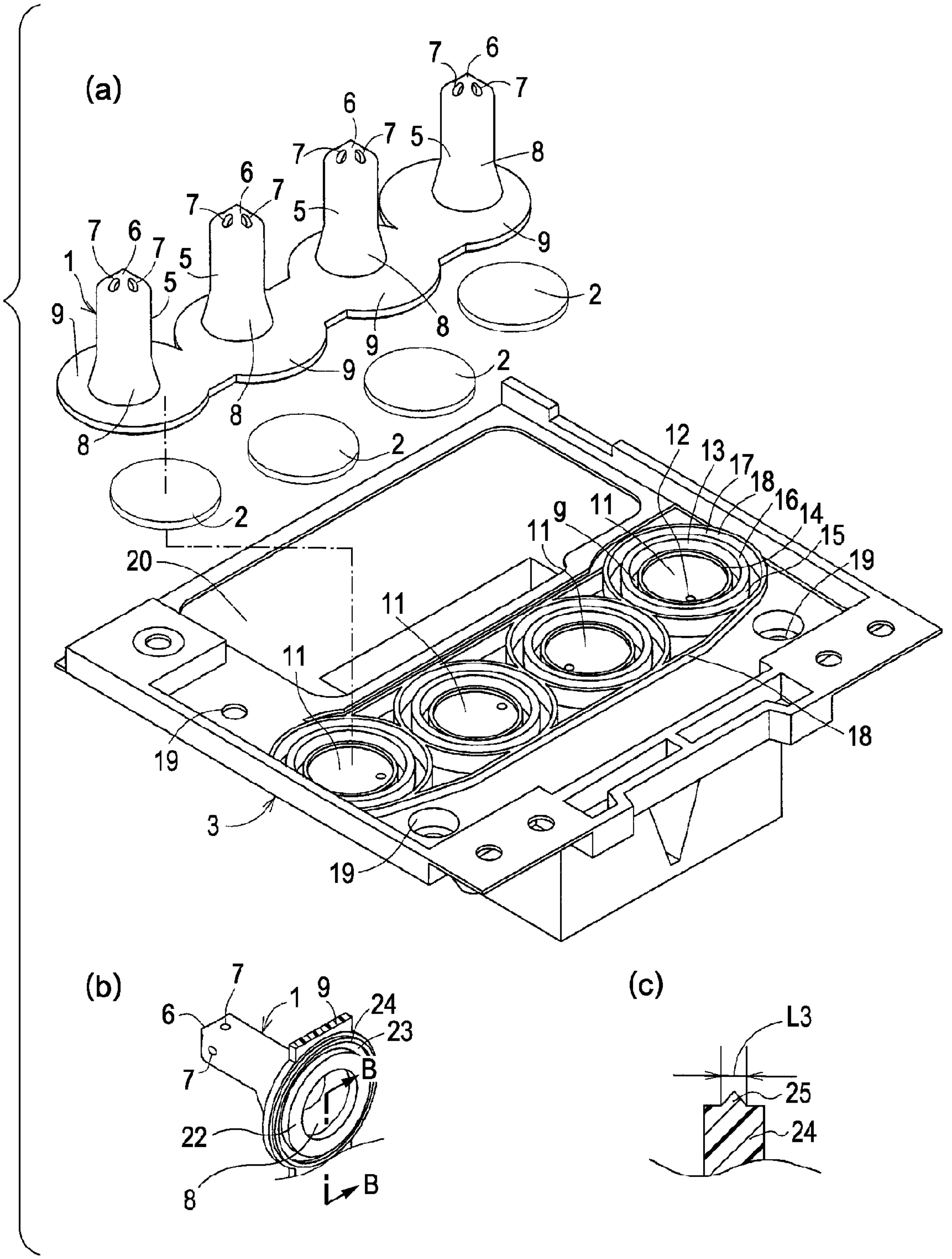
FIG. 1 is an exploded perspective view of an ink supply needle, a filter, and a holder base, Diagram b is a perspective view of the inside of a needle base body, and Diagram c is a cross-section view taken along line B-B of Diagram b of FIG. 1 (preferred embodiment).

Diagram a of FIG. 1 shows an exploded view of an ink supply needle 1, a filter 2, and a holder base 3.

In descriptions here, the ink supply needle 1 is commonly disposed upward and is configured such that predetermined parts of cartridges of various colors can be easily inserted into the ink supply needle from the upside. The ink supply needle is welded to be attached to the top face side of the holder base 3, as will be described later.

In addition, by attaching an ejection head not shown in the figure to the holder base 3, a liquid ejection head unit is formed. Then, ink from the cartridges is supplied to the ejection head from the ink supply needle 1 to the filter 2.

In Diagram a shown in FIG. 1, the ink supply needle 1 is a structure body in which a plurality of needle bodies 5 is integrally connected so as to be formed in parallel. The ink supply needle is configured by performing injection molding for a synthetic resin having a property that is appropriate for ultrasonic welding.

The number of the needle bodies 5 is four in a case where the number of the cartridges is four. However, the number of the needle bodies is not limited thereto and may be one, two, three, or five or more in correspondence with the number of the cartridges.

In addition, commonly, the number of the needle bodies 5 that are inserted into one liquid container such as a cartridge which is not shown in the figure is one. However, according to the present invention, a plurality of the needle bodies may be inserted into one liquid container.

The needle body 5 protrudes upward in the shape of a straight cylinder.

In the upper end part of the needle body 5, a casing lid 6 of which outer part is formed to protrude in the shape of an arc such that a needle connection opening part is likely not to cause any damage to a needle connection opening part in a case where the casing lid is inserted into the needle connection opening part of the liquid container such as the cartridge.

In the casing lid 6, a plurality of introduction holes 7 are formed.

The lower end part of the needle body 5 configures a needle base part 8 in the shape of a flare in which the inside diameter and the outside diameter of the needle body 5 gradually increase from the side of one end part of the needle body 5 to the side of the other end part.

The needle base part 8 is also referred to as a liquid introducing base part or the like.

In the needle base part 8, a connection piece 9 is disposed in the shape of a plate that expands from the peripheral edge part of the opening of the needle base part 8 which has the maximum bore diameter to the outer side in the diameter direction.

The preferred embodiment is a structure configured as a single plate shape in which the connection pieces 9 of four needle bodies 5 are disposed on a same face so as to be adjacent to each other and the peripheral edge parts of the adjacent connection piece 9 are connected to each other.

The filter 2 has a disk shape that is disposed between the needle base part 8 of the ink supply needle 1 and an inflow base part 11 of the holder base 3. The number of the disposed filters 2 is the same as that of the needle bodies 5.

The holder base 3 is also referred to as a head holder or the like and is a structure body in which the ink supply needle 1 is attached to the upper part of the holder base 3 and an ejection head such as a record head not shown in the figure is attached to the lower part of the holder base 3. The holder base is configured by performing injection molding for a synthetic resin having a property that is appropriate for ultrasonic welding.

In the holder base 3, the inflow base part 11, a base passage 12, a filter storing part 13, a filter receiving part 14, a base-side fitting part 15, a base-side bondage part 16, a base-side housing part 17, a fence part 18, a head attaching part 19, and a container installing part 20 are disposed.

The number of the inflow base parts 11 is the same as that of the needle bases 5 of the ink supply needle 1. The inflow base part is opened toward the upside and is depressed inside from the top face of the ink supply needle in the shape of a mortar.

When the connection pieces 9 of the ink supply needles are overlapped with the upper part of the holder base 3, the needle base parts 8 and the inflow base part 11 are individually in correspondence with each other.

The base passage 12 is separately disposed for each inflow base part 11 and passes through the slope face of the inflow base part 11 and the lower part of the holder base 3.

In addition, the ink supply needle 1 and the ejection head are mounted on the holder base 3, and a plurality of the liquid containers are individually mounted on the needle bases 5. Accordingly, when liquids are supplied to the ejection head from the liquid containers, the liquids are individually supplied from the liquid containers to a plurality of head passages through the introduction holes 7 of the ink supply needles 1, the inside of the needle bodies 5, the inside of the needle base parts 8, the inflow base parts 11 of the holder base 3, and the base passages 12.

The number of the head passages is the same as that of the liquid containers.

The filter storing part 13 is configured as a groove that is opened to the upper side of an area surrounding the opening having the maximum bore diameter of the inflow base part 11 and has a ring shape.

The filter receiving part 14 is configured as a protruded structure having a ring shape that protrudes upward from the peripheral edge part of the opening of the inflow base part 11 which is disposed on the upper side so as to surround the upper-side opening of the inflow base part 11.

The base-side fitting part 15 is configured as a protruded part (protruded structure) having a ring shape that surrounds the filter storing part 13.

Between the filter receiving part 14 and the base-side fitting part 15, there is a gap g in the shape of a ring opened upward.

The upper face of the base-side fitting part 15 is configured as the base-side bondage part 16 having a ring shape.

The base-side housing part 17 is a space for housing surplus synthetic resin 27 (see Diagram b of FIG. 3) that is melted to be output at a time when ultrasonic welding is performed. The base-side receiving part is configured as a groove that surrounds the base-side bondage part 16 in the shape of a ring that is opened upward.

In FIG. 1(*a*), the fence part 18 is configured as a protruded structure in the shape of a ring that protrudes upward from the peripheral edge part of the base-side housing part 17 so as to surround the base-side housing part 17.

The Diagram b of FIG. 1 shows the inside of one needle base part 8.

In Diagram b of FIG. 1, in the needle base part 8, a needle-side fitting part 22, a needle-side housing part 23, and a needle-side bondage part 24 are disposed.

The needle-side fitting part 22 configures a protruded structure having a ring shape that protrudes downward from the peripheral edge part of the opening so as to surround the opening of the needle base part 8 which has the maximum bore diameter.

The outside diameter of the needle-side fitting part 22 is configured to be slightly smaller than the inside diameter of the base-side bondage part 16, so that the needle-side fitting part 22 is fitted into the base-side bondage part 16 and the outer peripheral face of the needle-side fitting part 22 is sled to be closely brought into contact with the inner peripheral face of the base-side fitting part 15.

The needle-side housing part 23 is a space for housing surplus synthetic resin 26 (see Diagram b of FIG. 3) that is melted to be output at a time when ultrasonic welding is performed. The needle-side receiving part configures a groove that surrounds the needle-side fitting part 22 in the shape of a ring that is opened downward.

The needle-side bondage part 24 configures a protruded structure that protrudes downward from the peripheral edge part of the opening of the needle-side housing part 23 which is disposed on the lower side in the shape of a ring so as to surround the opening of the needle-side housing part 23 that is disposed on the lower side.

The Diagram c of FIG. 1 shows a cross-section of the needle-side bondage part 24 and a protruded part 25 taken along line B-B of Diagram b of FIG. 1.

In Diagram c of FIG. 1, in the needle-side bondage part 24, the protruded part 25 is disposed for concentrating energy at a time when the ultrasonic welding is performed.

The protruded part 25 protrudes downward from the bottom face of the ring shape of the needle-side bondage part 24 and is configured as a sharp end shape such as an isosceles triangle, of which horizontal width L3 decreases from the bottom face of the ring shape downward, in the plan view. However, other various shapes such as a right triangle may be considered as the shape of the protruded part.

Figure 2:
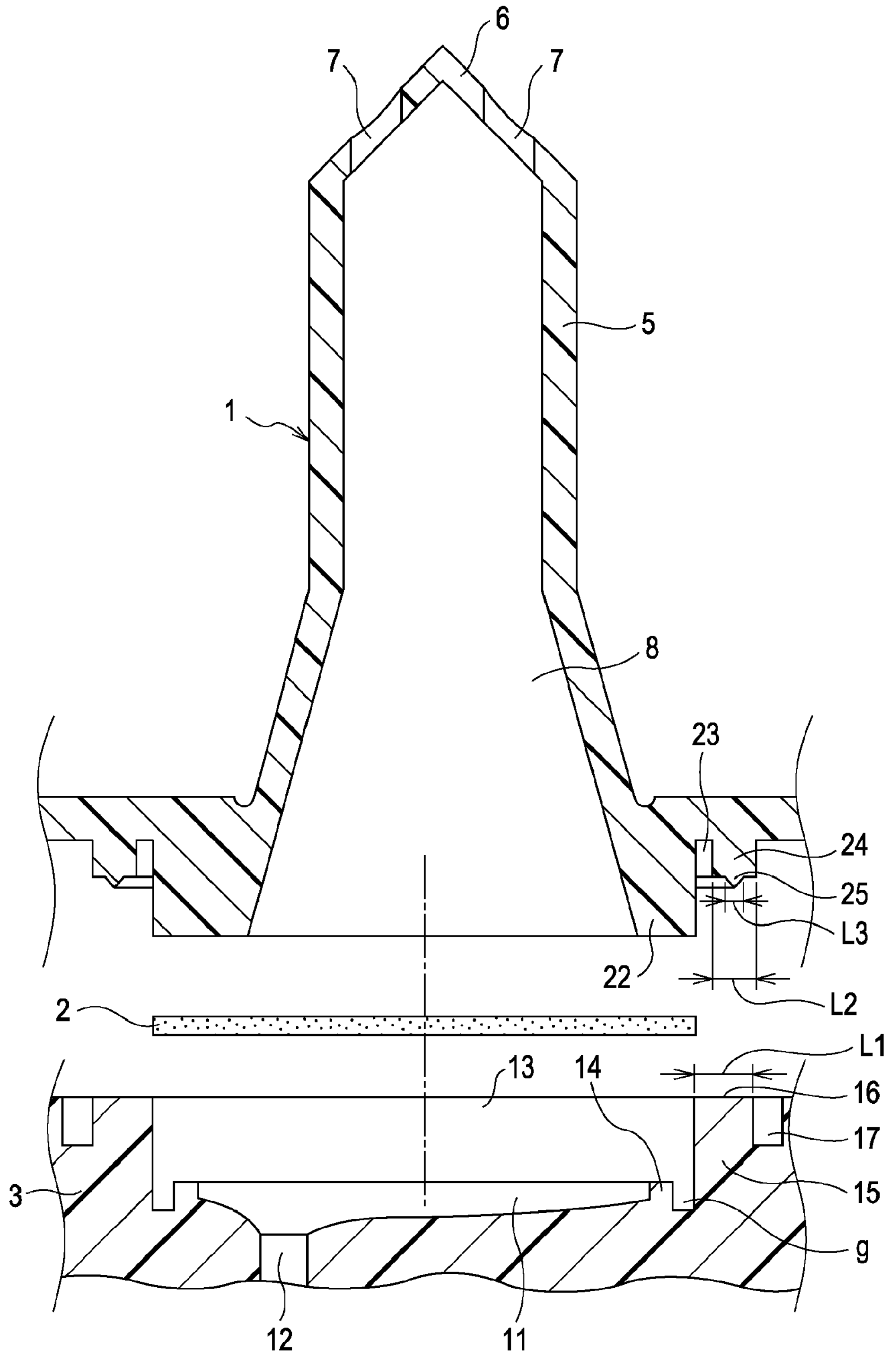
FIG. 2 is an exploded vertical cross-section view of one needle body of the ink supply needle, one filter, and one inflow base part of the holder base (preferred embodiment).

FIG. 2 shows a cross-section acquired by exploding and vertically cutting one needle body 5 of the ink supply needle 1, one filter 2, and one inflow base part 11 of the holder base 3.

In FIG. 2, the needle-side bondage part 24 is in the shape of a ring and is located in the same position as that of the base-side bondage part 16. The needle-side bondage part is brought into contact with the base-side bondage part. However, the horizontal width L2 of the needle-side bondage part is smaller than the horizontal width L1 of the base-side bondage part 16 (L2<L1).

The horizontal width L3 of the protruded part 25 is smaller than the horizontal width L2 of the needle-side bondage part 24 (L3<L2).

Figure 3:
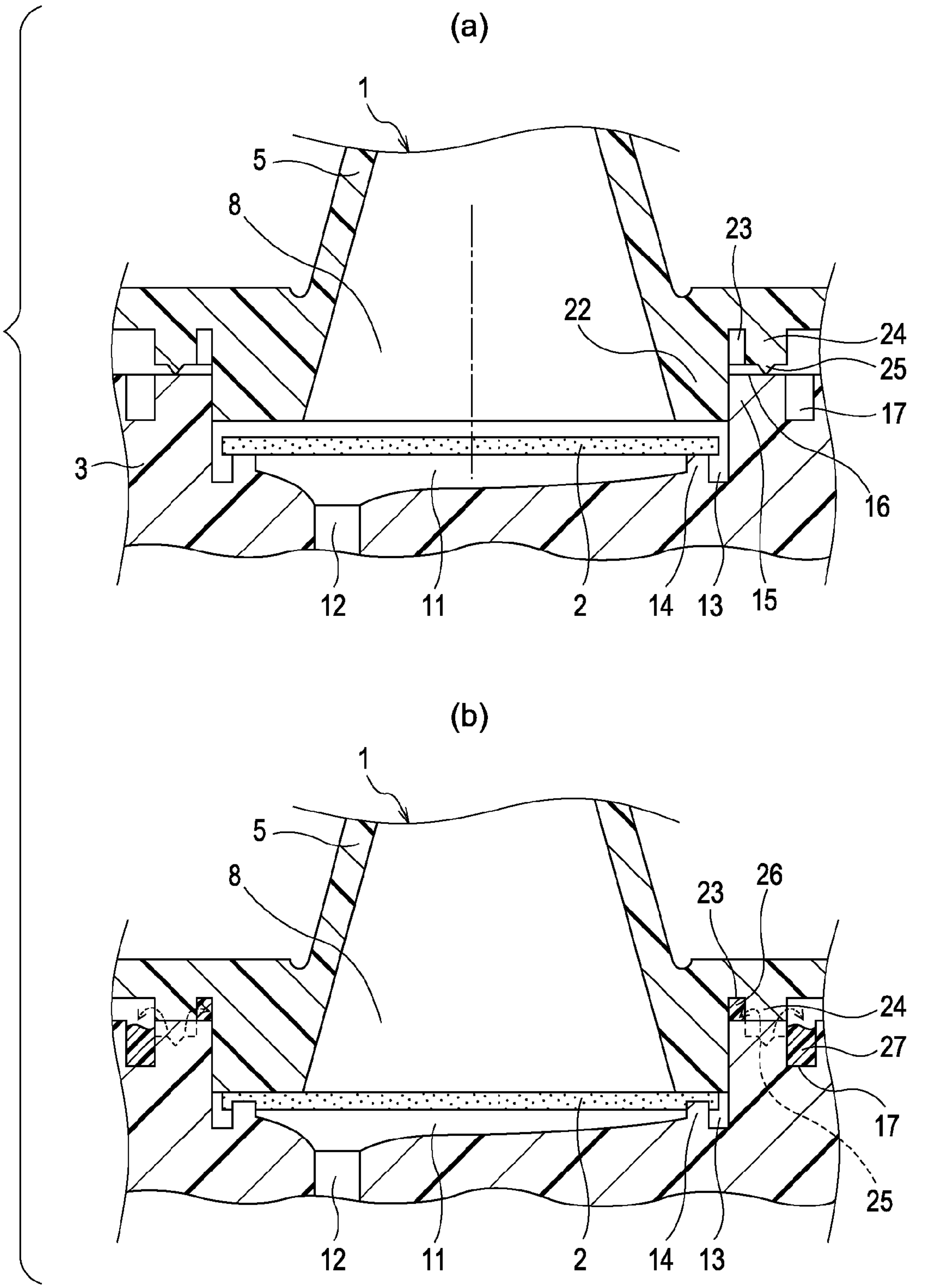
FIG. 3 is an assembly process of the ink supply needle, the filter, and the filter base (preferred embodiment).

FIG. 3 represents a process of assembling the ink supply needle 1, the filter 2, and the holder base 3.

First, as shown in Diagram a of FIG. 3, the filter 2 is interposed between the ink supply needle 1 and the holder base 14 is welded by applying heat to the holder base 14.

By housing the filter 2 in the filter storing part 13 from the upper side of the holder base 3, the edge part of the filter 2 is loaded on the filter receiving part 14.

Thereafter, the needle-side fitting part 22 is fitted into the base-side fitting part 15 from the upper side of the holder base 3.

Accordingly, the edge part of the filter 2 is located to face the filter receiving part 14 and the bottom face of the needle-side fitting part 22, and the sharp end of the protruded part 25 bumps a contact portion located in the upper end of the base-side bondage part 16 so as to be brought into contact with the contact portion.

Instead of the process of fitting the ink supply needle 1 into the holder base 3 after housing the filter 2 in the filter storing part 13, it may be configured that the filter 2 is bonded to the needle-side bondage part 22 so as to cover the opening of the lower side on the inside of the needle base part 8 or be bonded to the filter receiving part 14 so as to cover the opening of the upper side of the inflow base part 11 and then, the ink supply needle 1 is fitted into the holder base 3.

Next, the holder base 3 is loaded on a mount board of a processing machine, not shown in the figure, that performs an ultrasonic welding process, and an operation part that is in ultrasonic oscillation as a tool of the processing machine is pressed to a part of the needle base part corresponding to the needle-side fitting part 22.

Accordingly, as shown in Diagram b of FIG. 3, the ultrasonic oscillation is transferred from the operation part of the oscillator to the base-side bondage part 16 through the needle-side bondage part 24 and the protruded part 25 with the base-side bondage part 16 and the protruded part 25 pressed to each other.

As described above, when the ultrasonic oscillation is applied to the attachment structure of the ink supply needle 1 for the holder base 3, the protruded part 25 that protrudes from the needle-side bondage part 24 to the base-side bondage part 16 as a contact portion has a shape in which the horizontal width L3 decreases in the direction from the needle-side bondage part 24 to the base-side bondage part 16. Accordingly, the energy of the ultrasonic oscillation is concentrated on the protruded part 25 and the contact portion of the base-side bondage part 16 for the protruded part 25 from the needle-side bondage part 24, and the protruded part 25 and the contact portion of the base-side bondage part 16 for the protruded part 25 are melted out, so that the protruded part 25 penetrates into the base-side bondage part 16. Accordingly, the protruded part 25 and the base-side bondage part are appropriately bonded together as a whole without any gap.

As described above, the contact portion of the ink supply needle 1 and the holder base 3 is appropriately bonded as a whole without any gap by ultrasonic welding. Thus, when the structure body formed of the ink supply needle 1 and the holder base 3 is used in a liquid ejecting apparatus, there is an advantage that a liquid flowing from the ink supply needle 1 to the holder base 3 side does not leak out from the contact portion of the ink supply needle 1 and the holder base 3 to the outside.

Since the horizontal width L2 of the needle-side bondage part 24 is configured to have a size (L2<L1) smaller than that of the horizontal width L1 of the base-side bondage part 16, the contact portion is in a direct contact state. Accordingly, following the penetration of the protruded part 25 into the needle-side bondage part 24, the needle-side bondage part 24 as a contact portion is brought into contact with the base-side bondage part 16 as another contact portion. Thus, when ultrasonic waves are supplied from the ink supply needle, the energy of the ultrasonic oscillation is concentrated on the contact portion of the base-side bondage part 16 from the front end of the protruded part 25 of the needle-side bondage part 24, and the needle-side bondage part 24, the protruded part 25, and the base-side bondage part 16 are melted out, so that the protruded part 25 of the needle-side bondage part 24 is penetrated into the edge part of the base-side bondage part 16. Accordingly, there is an advantage that a part welded by the ultrasonic waves increases.

In particular, even when rattling is generated in the shape of the surface of the needle-side bondage part 24 as the contact portion or the surface of the base-side bondage part 16 more or less due to a molding error occurring at a time when an injection molding process is performed, or when there is unevenness due to attachment of dust or the like, the rattling due to the rattling or the like can be easily absorbed by contact of two protruded parts 25. Accordingly, the protruded parts 25 are melted before other parts, and thus, the welding process can be performed assuredly as is expected.

In addition, the needle-side housing part 23 is disposed between the needle-side fitting part 22 and the needle-side bondage part 24, and thus, in a process in which the base-side bondage part 16, the needle-side bondage part 24, and the protruded part 25 are welded together by ultrasonic waves, surplus synthetic resin 26 melted out on the needle-side housing part 23 side enters into the needle-side housing part 23.

A structure in which the base-side housing part 17 is disposed near the outer circumference of the base-side bondage part 16 is used, thus, in the process in which the base-side bondage part 16, the needle-side bondage part 24, and the protruded part 25 are welded together by ultrasonic waves, surplus synthetic resin 27 melted out on the base-side housing part 17 side enters into the base-side housing part 17.

Accordingly, when the ink supply needle 1 is appropriately bonded to the holder base 3 by ultrasonic welding, the surplus synthetic resin 26 or 27 melted out is received by one side or both sides of the base-side housing part 17 and the needle-side housing part 23. Accordingly, the synthetic resin is not overflowed to the filter 2 and the inflow base part 11 side from between matching surfaces of the base-side fitting part 15 and the needle-side fitting part 22. Therefore, in the attachment structure of the ink supply needle 1 for the holder base 3, there is an advantage that a passage through which liquid can flow from the inside of the needle base part 8 to the inflow base part 11 of the holder base 3 can be appropriately acquired.

Since the base-side bondage part 16 and the needle-side fitting part 22 are fitted into each other, the matching surfaces of the base-side fitting part 15 and the needle-side fitting part 22 are closely placed.

Accordingly, there is an advantage that the surplus synthetic resin 26 melted out is appropriately housed in the needle-side housing part 23 without penetrating into between the matching surfaces of the base-side fitting part 15 and the needle-side fitting part 22 through the needle-side housing part 23.

By performing ultrasonic welding for the base-side bondage part 16, the needle-side bondage part 24, and the protruded part 25, the bottom face of the needle-side bondage part 24 approaches the filter receiving part 14, and the outer circumferential part of the filter 2 is welded to the filter receiving part 14 and the needle-side bondage part 24. Therefore, there is an advantage that the filter 2 can appropriately exhibit a filter function for liquid flowing from the inside of the needle base part 8 to the inflow base part 11 of the holder base 3.

The protruded part 25 may be a plurality of independent bodies disposed in the circumferential direction of the base-side bondage part 16 instead of being integrally formed in the shape of a ring. However, as in the preferred embodiment, when the protruded part 25 is configured integrally in the shape of a ring, ultrasonic welding for the protruded part 25 and the contact portion of base-side bondage part 16 for the protruded part 25 can be performed for the entire area of the needle-side bondage part 24 in the circumferential direction. Therefore, in the attachment structure of the ink supply needle 1 for the holder base 3, there is an advantage that the strength of bondage between the ink supply needle 1 and the holder base 3 implemented by the ultrasonic welding is improved.

The base-side housing part 17 or the needle-side housing part 23 may be a plurality of independent bodies disposed in the circumferential direction of the base-side housing part 17 or the needle-side housing part 23 without being formed as a groove that is integrally formed in the shape of a ring. However, as in the preferred embodiment, when the base-side housing part 17 or the needle-side housing part 23 is configured as a groove that is integrally formed in the shape of a ring, in ultrasonic welding for the base-side housing part 17 or the needle-side housing part 23, there are advantages that the volume for housing the surplus synthetic resin 26 or 27 melted out increases and the surplus synthetic resin melted out in the ultrasonic welding process can be appropriately housed in the base-side housing part 17 or the needle-side housing part 23.

The base-side housing part 17 is formed near the base-side fitting part 15, or the needle-side housing part 23 is formed near the needle-side fitting part 22. Accordingly, there is an advantage that the surplus synthetic resin 26 or 27 melted out in the ultrasonic welding process can be appropriately housed in the base-side housing part 17 or the needle-side housing part 23.

In addition, according to the present invention, the melted synthetic resin runs out to the base-side housing part 17 or the needle-side fitting part 23 in a speedy manner, and thus, successive melt resin can be melted without any barrier and can be melted smoothly. Therefore, a time for the ultrasonic welding process can be shortened as a whole.

In FIG. 2, any one between the base-side housing part 17 and the needle-side housing part 23 may be removed. In such a case, when one that is closer to the matching surface of the base-side fitting part 15 and the needle-side fitting part 22 is left by removing the other that is farther from the matching surface of the base-side fitting part 15 and the needle-side fitting part 22, there is an advantage that the surplus synthetic resin 16 (see Diagram b of FIG. 3) melted out in the ultrasonic welding process does not reach the matching surface of the base-side fitting part 15 and the needle-side fitting part 22.

The protruded part 25 is disposed in the needle-side bondage part 24 as the contact portion on one side. However, the protruded part may be disposed in the base-side bondage part 16 as the contact portion on the other side. Alternatively, the protruded part 25 may be disposed in both of the base-side bondage part 16 and the needle-side bondage part 24.

Figure 4:
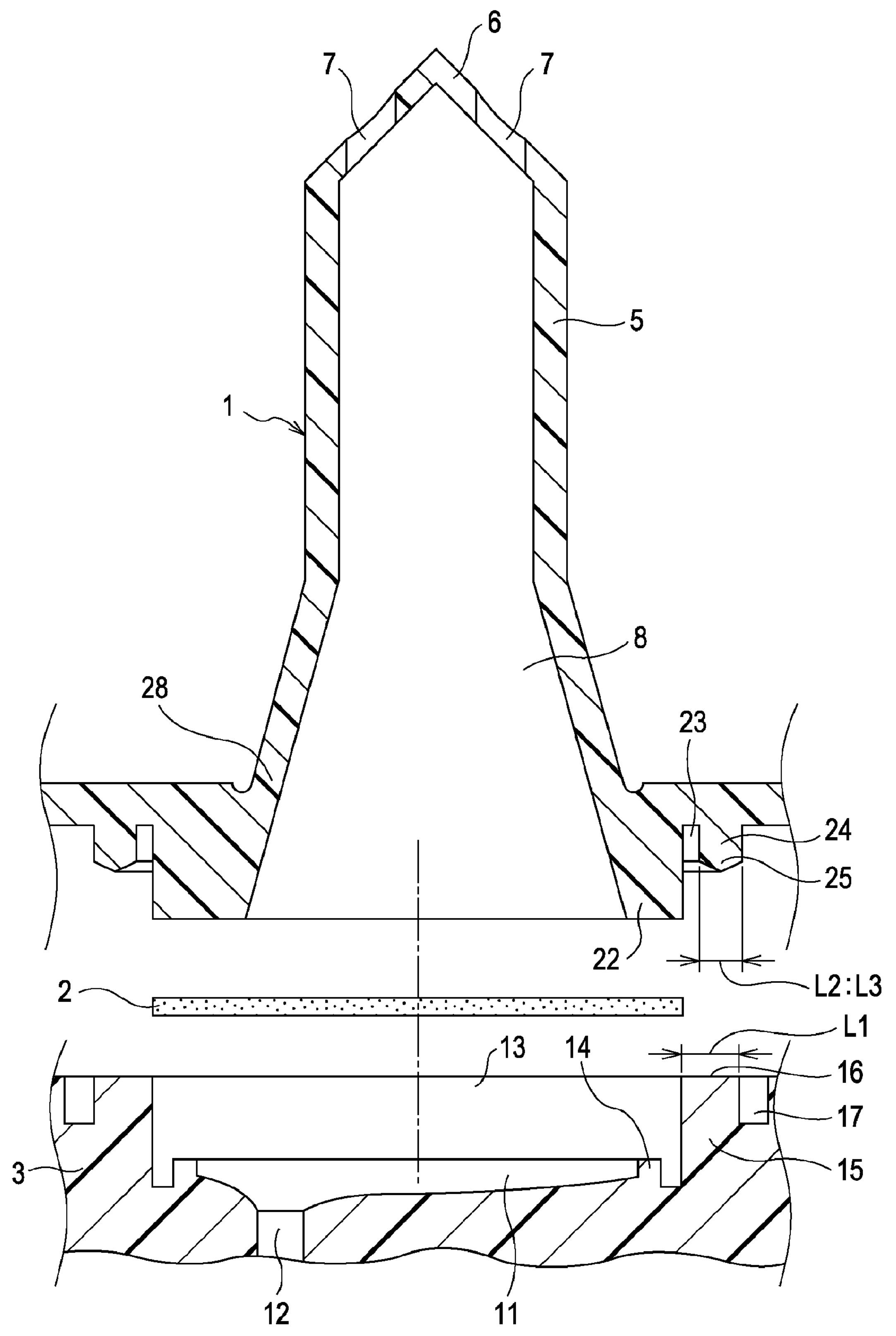
FIG. 4 is a cross-section view of a needle-side bondage part and an energy concentration part (first embodiment).

FIG. 4 shows a cross-section of the needle-side bondage part 24 and the protruded part 25 according to a first embodiment of the invention.

In FIG. 4, the horizontal width L3 of the protruded part 25 is formed to have the same size as that of the horizontal width L2 of the needle-side bondage part 24 (L2=L3).

In other words, the protruded part 25 may have a structure in which the protruded part becomes thinner from the needle-side bondage part 24 to the lower side.

Figure 5:
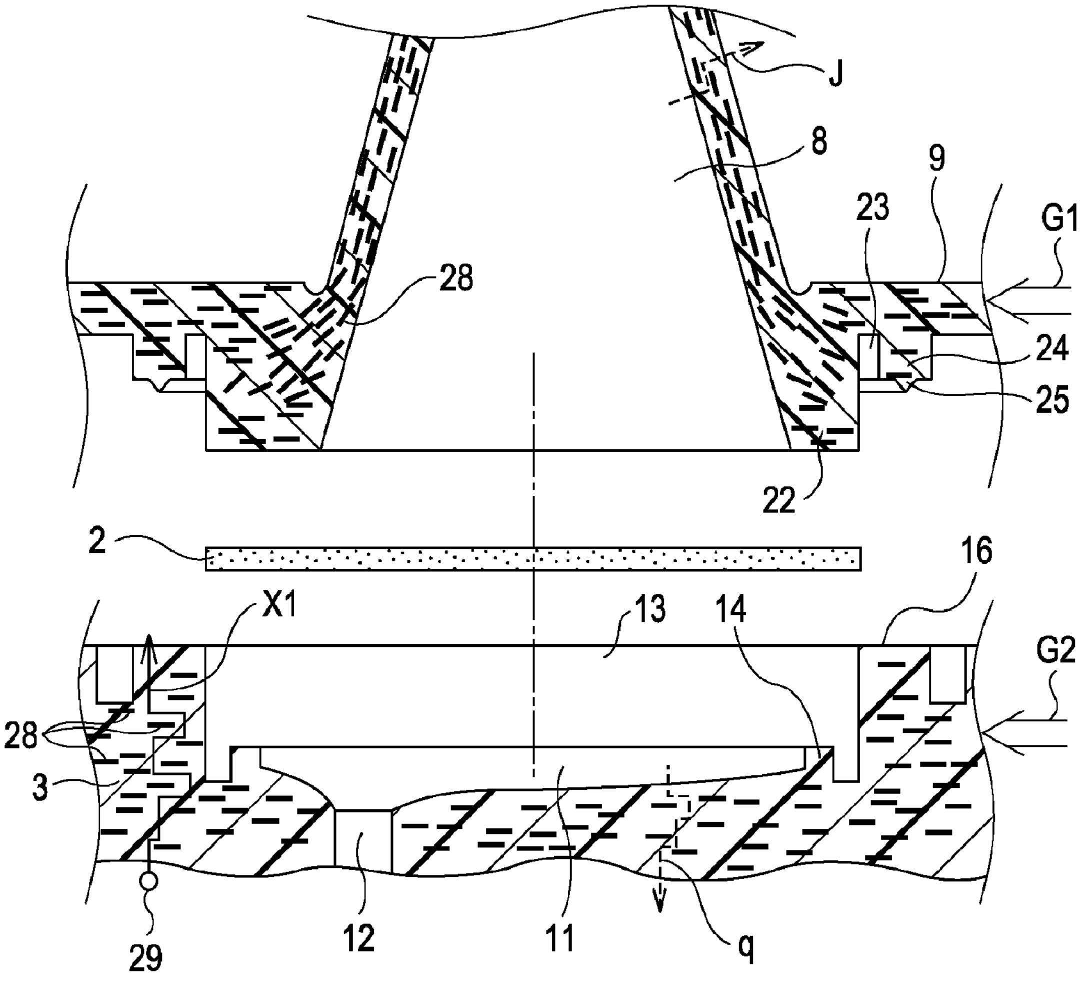
FIG. 5 is an exploded vertical cross-section view of one needle body of the ink supply needle, one filter, and one inflow base part of the holder base (second embodiment).

FIG. 5 shows a cross-section acquired by exploding and horizontally cutting one needle body 5 of the ink supply needle 1, one filter 2, and one inflow base part 11 of the holder base 3 according to a second embodiment of the invention.

In FIG. 5, the ink supply needle 1 and the holder base 3 are formed of synthetic resin that contains a plate-shaped filler 28 and has a physical property appropriate for ultrasonic welding.

In the second embodiment, the plate-shaped filler 28 is formed as not a common fibrous form body of glass or the like but a plate shape of glass, for example, having a size of 5 μm×80 μm×80 μm or the like. For example, the plate-shaped filler contains about 0.05 to 10 mass.

Then, a large amount of the fillers 28 is mixed into synthetic resin having a physical property appropriate for the ultrasonic welding process which is supplied to an injection-molding machine that molds the ink supply needle 1 or the holder base 3.

When the melted synthetic resin that contains the fillers 28 and has a physical property appropriate for the ultrasonic welding process is ejected from an injection molding machine to a forming die that is used for molding the ink supply needle 1 or the holder base 3, the large amount of the fillers 28 is in the form arranged to be a parallel layer in accordance with the flow of the resin to the forming die.

Thus, gas molecules 29 such as gas or water vapor are blocked by the plate-shaped fillers 28 and cannot be transmitted.

In other words, a distance through which the gas molecules 29 are transmitted, for example, through the ink supply needle 1 or the holder base 3 from the inner side to the outer side or from the outer side to the inner side is lengthened as denoted by arrow X1 due to meander. Accordingly, there is an advantage that the performance of the ink supply needle 1 or the holder base 3 as the gas barrier can be improved.

Conventionally, although a filler has been tried to be formed by mixing a fibrous-formed filler into synthetic resin, it is not easy to block the ink vapor assuredly by using the filler. However, according to the present invention, each plate-shaped filler 28 is in the shape of a flat form, and thus, the length of flow of gas and the water vapor from the inner side to the outer side becomes large. Accordingly, the gas or the water vapor can be blocked assuredly, and thereby, durability and reliability can be improved.

In addition, by mixing the plate-shaped fillers 28, the shape retaining property of injection molding is excellent, and accordingly, the shape of the mold can be retained assuredly without breaking the shape of the mold.

In addition, some of the plate-shaped fillers 28 are exposed from the protruded part 25 to the surface. Thus, when the plate-shaped filler 28 exposed from the protruded part 25 is brought into tight contact with the base-side bondage part 16, the ultrasonic oscillation can be focused more easily. Accordingly, the melting process can be performed in a speedy manner, and therefore, the ultrasonic welding process can be performed in a short time.

In addition, as shown in FIG. 5, an injection gate G1 is disposed in one spot or a plurality of spots in the connection piece 9, and the resin is injected from the injection gate, and accordingly, the resin is injected such that the resin flows from the connection piece 9 to the side of the upper end of the ink supply needle 1. Accordingly, the plate-shaped fillers 28 are aligned along the flow and are aligned so as to surround the inner side of the ink supply needle 1. Therefore, the plate-shaped fillers are aligned in the direction for blocking the leakage of the ink gas and the water vapor.

The flow passage of the gas and the like is denoted by J in the figure and is in the meandered state as described above. Thus, the flow passage for leakage of the gas and the vapor water is lengthened, and accordingly, it can be known that the leakage cannot occur easily.

In addition, also for the holder base 3, a gate G2 is disposed in one spot or a plurality of spots such that injection of the resin is performed from the horizontal direction. Thus, the resin flows along an approximately horizontal plane of the holder base 3, and accordingly, the plate-shaped fillers 28 are aligned along the horizontal plane.

The flow passage denoted by q in the figure represents a flow passage of leakage of the gas and the like and is in the meandered state due to the blocking function of the fillers 28 as described above. Accordingly, the flow passage is lengthened, and it can be known that the leakage cannot easily occur.

In FIG. 5, it may be configured that one between the ink supply needle 1 and the holder base 3 is formed of synthetic resin that contains the plate-shaped fillers 28 and has a physical property appropriate for the ultrasonic welding process, and the other is configured by synthetic resin that does not contain the plate-shaper filler 28 and has a physical property appropriate for the ultrasonic welding process.

Figure 6:
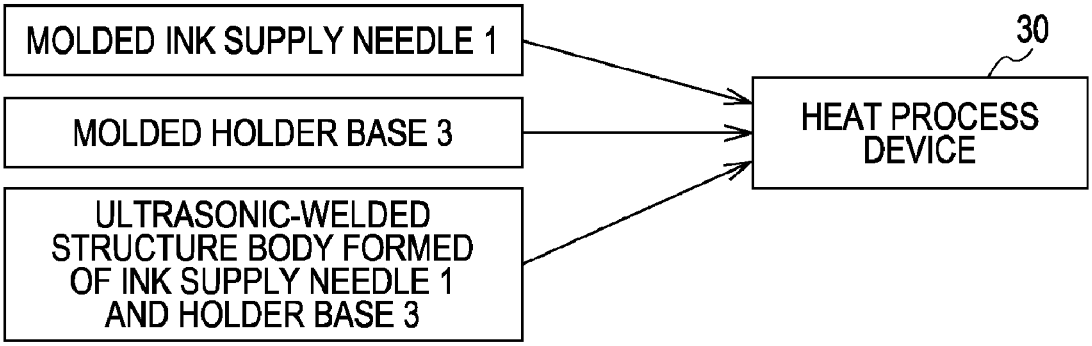
FIG. 6 is a process diagram of an anneal process (third embodiment).
Figure 7:
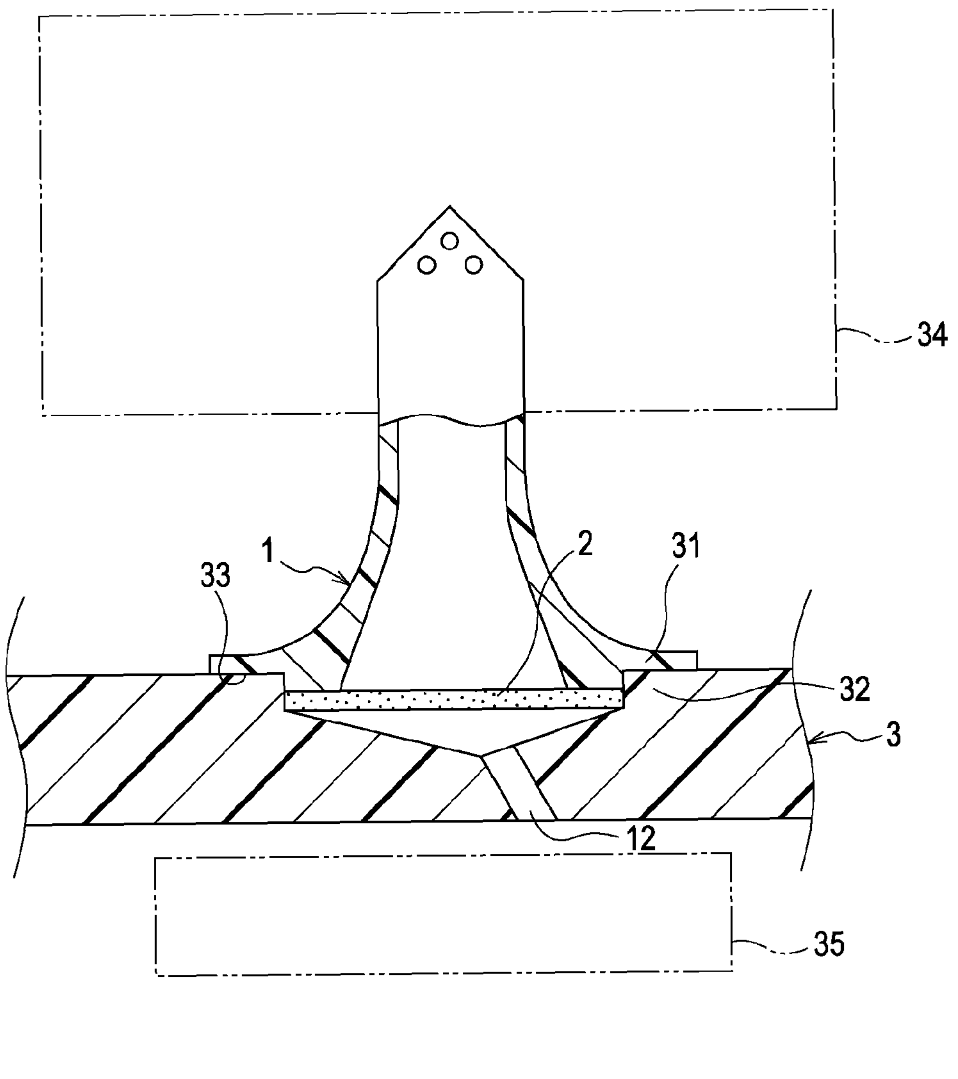
FIG. 7 PRIOR ART
FIG. 7 is a vertical cross-section view of a structure body formed by an ink supply needle and a holder base (conventional).

FIG. 6 represents a process according to a third embodiment of the invention.

In FIG. 6, the ink supply needle 1 discharged from the molding machine or the holder base 3 discharged from the molding machine is inserted into a heat process device 30 and is annealed (as an example, heated for about two hours at 110° C.±5° C.). Then, the ink supply needle 1 and the holder base 3 taken out from the heat process device 30 are bonded together by performing an ultrasonic welding process.

In addition, a structure body formed by performing the ultrasonic welding process for the ink supply needle 1 and the holder base 3 is inserted into the heat process device 30 to be annealed.

Then, an ultrasonic-welded part of the structure body formed of the ink supply needle 1 and the holder base 3 for which the anneal process is performed and an ultrasonic-welded part of a structure body formed of the ink supply needle 1 and the holder base 3 for which the anneal process is not performed are tested. There was an advantage that the structure body, for which the anneal process had been performed, had the bondage state and the bondage strength better than those of the structure body for which the anneal process had not been performed.

In particular, when the ink supply needle 1 is annealed, the melting point thereof rises. Thus, when the ultrasonic welding process is performed with the annealed ink supply needle pressed to the not-annealed holder base 3, the contact portion side (a part to which the protruded part 25 is pressed) of the not-annealed holder base 3 having a low melting point is melted first. Accordingly, the melted resin flows into the housing parts 17 and 23 to be housed and is buried in the contact portion of the protruded part 25.

Thereafter, the protruded part 25 is melted. Accordingly, it was verified that the integrity of the protruded part 25 and the holder base 3 increased.

The descriptions above also apply to a case where the protruded part is disposed on the holder base 3 side and the ultrasonic welding process is performed with the protruded part to be brought into contact with the contact portion side of the ink supply needle 1. In addition, also for a case where only the holder base 3 is annealed and the melting point of the holder base 3 is raised, the protruded part can be inserted to the contact portion of the ink supply needle, and accordingly, the integrity thereof can be increased.

In addition, by annealing a resin product as described above, the melting point can be set to be high. However, the invention is not limited to an anneal process. Thus, even when an infrared ray is projected, the same advantage as that for a case where the anneal process is performed can be acquired.

Alternatively, when the molding temperature of a part in the injection molding process is set high to be 150° C. for which the molding temperature is 60° C. normally, a time for a cooling process is lengthened. However, in such a case, the same advantage as described above can be acquired.

In addition, the anneal process is not needed to be performed for the whole product, and the anneal process may be performed locally for one or both of the protruded part and a part with which the protruded part is brought into contact.

In the preferred embodiment, the first embodiment, the second embodiment, and the third embodiment that are described above, a printer that ejects ink has been described as an example. However, the present invention, as described above, may be used in a liquid ejecting apparatus that ejects a color liquid material of a color filter, an electrode liquid material, a bioorganic liquid material or the like.

The invention claimed is:

1. A method for manufacturing an attachment structure including a liquid supply needle and a holder base, the method comprising:

welding the holder base to the liquid supply needle by ultrasonic welding, wherein the holder base includes a base bonding part comprising a first ring which protrudes from a peripheral edge of a filter receiving part which is configured to house a filter and wherein the liquid supply needle includes a needle bondage part formed adjacent to and outside of an opening of the liquid supply needle, the needle bondage part comprising a second ring protruding from a surface of a liquid supply surface facing the holder base, the needle bondage part having flat surface facing the base bonding part with a protruded part formed thereon; and raising the melting point of the protruded part by performing an anneal process, an infrared ray projecting process, or an injection molding process at a molding temperature of 150 degrees Celsius or above, and wherein a horizontal width of the needle bondage part is smaller than a horizontal width of the base bondage part and wherein the horizontal width of the protruded part is smaller than the horizontal width of the needle bondage part.

2. The attachment structure method according to claim 1, wherein the protruded part is disposed in the shape of a ring near the liquid supply needle.

3. The method according to claim 1, wherein a housing part that houses a melted material is disposed in the vicinity of the protruded part.

4. The attachment structure method according to claim 3, wherein the housing part is a groove in the shape of a ring.

5. The method according to claim 1, wherein at least one of the group containing the liquid supply needle and the holder base is formed of resin that contains a plate-shaped filler.

6. A method for forming a liquid ejection head unit including a liquid supply needle, a holder base, and an ejection head that is supported by the holder base, the method comprising:

welding the holder base to the liquid supply needle by ultrasonic welding, wherein the holder base includes a base bonding part comprising a first ring which protrudes from a peripheral edge of a filter receiving part which is configured to house a filter and wherein the liquid supply needle includes a needle bondage part formed adjacent to and outside of an opening of the liquid supply needle, the needle bondage part comprising a second ring protruding from a surface of a liquid supply surface facing the holder base, the needle bondage part having flat surface facing the base bonding part with a protruded part formed thereon; and raising the melting point of the protruded part by performing an anneal process, an infrared ray projecting process, or an injection molding process at a molding temperature of 150 degrees Celsius or above, and wherein a horizontal width of the needle bondage part is smaller than a horizontal width of the base bondage part and wherein the horizontal width of the protruded part is smaller than the horizontal width of the needle bondage part.

7. The method according to claim 6, wherein the protruded part is disposed in the shape of a ring near the liquid supply needle.

8. The liquid ejection head unit method according to claim 6, wherein a housing part that houses a melted material is disposed in the vicinity of the protruded part.

9. The method according to claim 8, wherein the housing part is a groove in the shape of a ring.

10. The method according to claim 6, wherein at least one of the group containing the liquid supply needle and the holder base is formed of resin that contains a plate-shaped filler.

11. A liquid ejecting apparatus comprising the liquid ejection head unit formed according to claim 6.

12. A method of manufacturing a liquid ejection unit, the method comprising:

bringing a liquid supply needle in which a protruded part is disposed and a holder base into contact with each other in the protruded part and bonding the liquid supply needle and the holder base by ultrasonic welding, wherein the holder base includes a base bonding part comprising a first ring which protrudes from a peripheral edge of a filter receiving part which is configured to house a filter and wherein the liquid supply needle includes a needle bondage part formed adjacent to and outside of an opening of the liquid supply needle, the needle bondage part comprising a second ring protruding from a surface of a liquid supply surface facing the holder base, the needle bondage part having flat surface facing the base bonding part with a protruded part formed thereon;

raising the melting point of the protruded part by performing an anneal process, an infrared ray projecting process, or an injection molding process at a molding temperature of 150 degrees Celsius or above; and attaching an ejection head to the holder base, wherein a horizontal width of the needle bondage part is smaller than a horizontal width of the base bondage part and wherein the horizontal width of the protruded part is smaller than the horizontal width of the needle bondage part.

* * * * *